US012722883B2

(12) United States Patent
Morand et al.

(10) Patent No.: US 12,722,883 B2
(45) Date of Patent: Sep. 1, 2026

(54) BAG CONFIGURATION FOR PAIL

(71) Applicant: ANGELCARE CANADA INC., Montréal (CA)

(72) Inventors: Michel Morand, Montréal (CA); Maurice Pinsonnault, Candiac (CA)

(73) Assignee: ANGELCARE CANADA INC., Montreal (CA)

( * ) Notice: Subject to any disclaimer, the term of this patent is extended or adjusted under 35 U.S.C. 154(b) by 0 days.

(21) Appl. No.: 18/036,633

(22) PCT Filed: Nov. 12, 2021

(86) PCT No.: PCT/CA2021/051609

§ 371 (c)(1), (2) Date: May 11, 2023

(87) PCT Pub. No.: WO2022/099417

PCT Pub. Date: May 19, 2022

(65) Prior Publication Data

US 2023/0415979 A1 Dec. 28, 2023

Related U.S. Application Data

(60) Provisional application No. 63/112,976, filed on Nov. 12, 2020.

(51) Int. Cl.

*B65F 1/06* (2006.01)
*B65D 33/00* (2006.01)
(Continued)

(52) U.S. Cl.

CPC ............ *B65F 1/062* (2013.01); *B65D 33/002* (2013.01); *B65D 83/0805* (2013.01); *B65F 1/0006* (2013.01); *B65F 1/0026* (2013.01)

(58) Field of Classification Search

CPC ...... B65D 33/002; B65D 33/02; B65D 33/28; B65F 1/0006; B65F 1/06; B65F 1/065
(Continued)

(56) References Cited

U.S. PATENT DOCUMENTS 4,747,701 A * 5/1988 Perkins .................... B65D 5/60 383/73
4,904,092 A * 2/1990 Campbell ............ B65D 33/002 206/390
(Continued)

FOREIGN PATENT DOCUMENTS

CN 1402684 A 3/2003
CN 201077639 Y 6/2008
(Continued)

OTHER PUBLICATIONS

International Search Report for corresponding application PCT/CA2021/051609 filed Nov. 12, 2021; Mail date Jan. 5, 2022.
(Continued)

*Primary Examiner* — Nathan J Newhouse
*Assistant Examiner* — Nina K Attel
(74) *Attorney, Agent, or Firm* — CANTOR COLBURN LLP

(57) ABSTRACT

A bag for waste disposal is disclosed. The bag has a tubular body with a top open end and a bottom closed end, the tubular body having a first section adjacent the top open end, and at least a second section adjacent to the bottom closed end. The first section has a greater stretchability than the second section. The tubular body in a flattened two-fold condition has a pair of side edges extending from a top edge to a bottom edge, the top edge delimiting the top open end, the bottom edge delimiting the bottom closed end.

24 Claims, 7 Drawing Sheets

(51) Int. Cl.
*B65D 83/08* (2006.01)
*B65F 1/00* (2006.01)

(58) Field of Classification Search
USPC ............. 383/37; 220/495.07, 495.11, 495.08
See application file for complete search history.

(56) References Cited

U.S. PATENT DOCUMENTS

| | | | | |
|---|---|---|---|---|
| 5,205,650 | A | 4/1993 | Rasmussen | |
| 6,150,647 | A * | 11/2000 | Anderson | B65D 81/3461 428/152 |
| 6,513,975 | B1 * | 2/2003 | Jackson | B65D 33/00 383/105 |
| 6,605,172 | B1 * | 8/2003 | Anderson | B32B 27/12 156/199 |
| 6,695,476 | B2 * | 2/2004 | Jackson | B65D 33/00 383/77 |
| 7,093,978 | B2 * | 8/2006 | Tan | B31B 70/00 383/120 |
| 7,459,191 | B2 | 12/2008 | Sleight et al. | |
| 7,942,577 | B2 * | 5/2011 | Fraser | B65D 33/28 383/71 |
| 9,487,334 | B2 * | 11/2016 | Cobler | B65D 33/1608 |
| 2001/0022865 | A1 | 9/2001 | Meyer | |
| 2002/0003910 | A1 | 1/2002 | Jackson | |
| 2010/0046860 | A1 * | 2/2010 | Kent | B65F 1/0006 383/75 |
| 2011/0052105 | A1 | 3/2011 | Wilcoxen et al. | |
| 2018/0222672 | A1 | 8/2018 | Leon | |
| 2022/0204216 | A1 * | 6/2022 | Ferracane | B65D 33/00 |

FOREIGN PATENT DOCUMENTS

| | | | |
|---|---|---|---|
| DE | 202008013591 | U1 | 2/2010 |
| JP | 2003285901 | A | 10/2003 |
| JP | 2008013203 | A | 1/2008 |
| WO | 2019092539 | A2 | 5/2019 |

OTHER PUBLICATIONS

Written Opinion for corresponding application PCT/CA2021/051609 filed Nov. 12, 2021; Mail date Jan. 5, 2022.
Japanese Office Action 2023-528426; Report dated Aug. 4, 2025.

* cited by examiner

BAG CONFIGURATION FOR PAIL

CROSS-REFERENCE TO RELATED APPLICATION

The present application claims the priority of U.S. Patent Application No. 63/112,976, filed on Nov. 12, 2020, and incorporated herein by reference.

TECHNICAL FIELD

The present application pertains to bag rolls as used in waste-disposal units, such as garbage cans, pails, composts, etc.

BACKGROUND OF THE ART

Disposal units, such as garbage cans, pails, composts, recycling bins are conventionally configured to support a bag. For convenience and cost-effective packaging, the bags are commonly part of a bag roll, with the bags interconnected one to another. In a particular configuration, bag rolls are stored in a bottom of a pail or wire rack, and a free end of the bag roll is raised to be supported open at a top end of the pail or wire rack. Accordingly, when a bag is full of waste or other items, the filled bag may be removed for the next bag in the roll to be deployed for receiving waste. However, as bags are filled with waste, they increase in volume and may be hard to remove from a pail or wire rack, especially if the filled bags are to be pulled upwardly out of the pail.

SUMMARY

It is an aim of the present disclosure to provide a novel bag roll and/or cassette for dispensing waste bags.

In accordance with a first aspect, there is provided a bag comprising: a tubular body with a top open end and a bottom closed end, the tubular body having a first section adjacent the top open end, and at least a second section adjacent to the bottom closed end, the first section having a greater stretchability than the second section, and the tubular body in a flattened two-fold condition having a pair of side edges extending from a top edge to a bottom edge, the top edge delimiting the top open end, the bottom edge delimiting the bottom closed end.

In accordance with a second aspect, there is provided a bag comprising: a tubular body with a top open end and a bottom closed end, the tubular body having a first section adjacent the top open end, and at least a second section adjacent to the bottom closed end, the first section having surface features only in the first section, first section such that the first section having a greater stretchability than the second section, and the tubular body in a flattened two-fold condition having a pair of side edges extending from a top edge to a bottom edge, the top edge delimiting the top open end, the bottom edge delimiting the bottom closed end.

In accordance with a third aspect, there is provided a bag comprising: a tubular body with a top open end and a bottom closed end, the tubular body having a first section adjacent the top open end, and at least a second section adjacent to the bottom closed end, the first section having corrugations defined in a material of the tubular body, the corrugations being only in the first section of the tubular body from the top open end, such that the first section has a greater stretchability than the second section, and the tubular body in a flattened two-fold condition having a pair of side edges extending from a top edge to a bottom edge, the top edge delimiting the top open end, the bottom edge delimiting the bottom closed end.

In accordance with any of the above aspects, for example, the surface features are defined by a surface pattern including an array of dimples formed into the tubular body in the first section.

In accordance with any of the above aspects, for example, the surface features include one of rounded, diamond shaped, and honeycomb shaped dimples.

In accordance with any of the above aspects, for example, the surface features include at least one peripherally extending line of embossed areas spaced apart from each other by non embossed areas.

In accordance with any of the above aspects, for example, the surface features include corrugations extending in a direction from the top open end to the bottom closed end.

In accordance with any of the above aspects, for example, the surface features include corrugations extending from the top open end along all of a length of the first section, without extending in the second section.

In accordance with any of the above aspects, for example, the surface features includes corrugations and interstitial spaces inherent to the corrugations defining a pattern of adjacent thinner and thicker areas of the tubular body in the first section.

In accordance with any of the above aspects, for example, the surface features are spread on an entire surface of the tubular body in the first section.

In accordance with any of the above aspects, for example, the corrugations extend from the top open end along all of a length of the first section, without extending in the second section.

In accordance with any of the above aspects, for example, the corrugations are formed on an entire surface of the tubular body in the first section.

In accordance with any of the above aspects, for example, the tubular body in the first section has an elongation at break greater than that of the tubular body in the second section.

In accordance with any of the above aspects, for example, the tubular body in the first section has an elongation at break between 105% and 200% of that of the tubular body in the second section.

In accordance with any of the above aspects, for example, the tubular body in the first section has a yield strength smaller than that of the tubular body in the second section.

In accordance with any of the above aspects, for example, the tubular body in the first section has a yield strength between 50% and 95% of that of the tubular body in the second section.

In accordance with any of the above aspects, for example, the tubular body in the first section has an elastic modulus smaller than that of the tubular body in the second section.

In accordance with any of the above aspects, for example, the first section is a top section and the second section is a middle section, the tubular body further having a bottom section defining the closed bottom end, the top section having a length LA, the middle section having a length LB and the bottom section having a length LC, the length LA smaller than LB+LC.

In accordance with any of the above aspects, for example, the first section has a length LA extending from the top open end and the second section extends from the first section to the bottom closed end, the second section having a length LB, the length LA between 5% and 20% of the length LB.

In accordance with any of the above aspects, for example, the first section has a length LA extending from the top open end and the second section extends from the first section to the bottom closed end, the second section having a length LB, the length LA between 5% and 10% of the length LB.

In accordance with any of the above aspects, for example, the first section has a length LA extending from the top open end and the second section extends from the first section to the bottom closed end, the second section having a length LB, the length LA smaller than a third of the length LB.

In accordance with a further aspect, there is provided a bag roll comprising: a plurality of the bag according to any of the above, wherein the bags are connected end to end and from the bottom edge of a first of the bags in the bag roll, to the top edge of a second of the bags in the bag roll.

In accordance with a further aspect, there is provided a bag dispensing cassette comprising the bag roll and a receptacle enclosing at least part of the bag roll.

In accordance with a further aspect, there is provided a bag dispensing cassette comprising a tubular film defining a plurality of bags according to any of the above, and a receptacle enclosing at least part of the plurality of bags, the plurality of bags connected end to end and from the bottom edge of a first one of the bags, to the top edge of a second one of the bags, the tubular film accumulated in a fanfold or multifold configuration.

DETAILED DESCRIPTION

Figure 1:
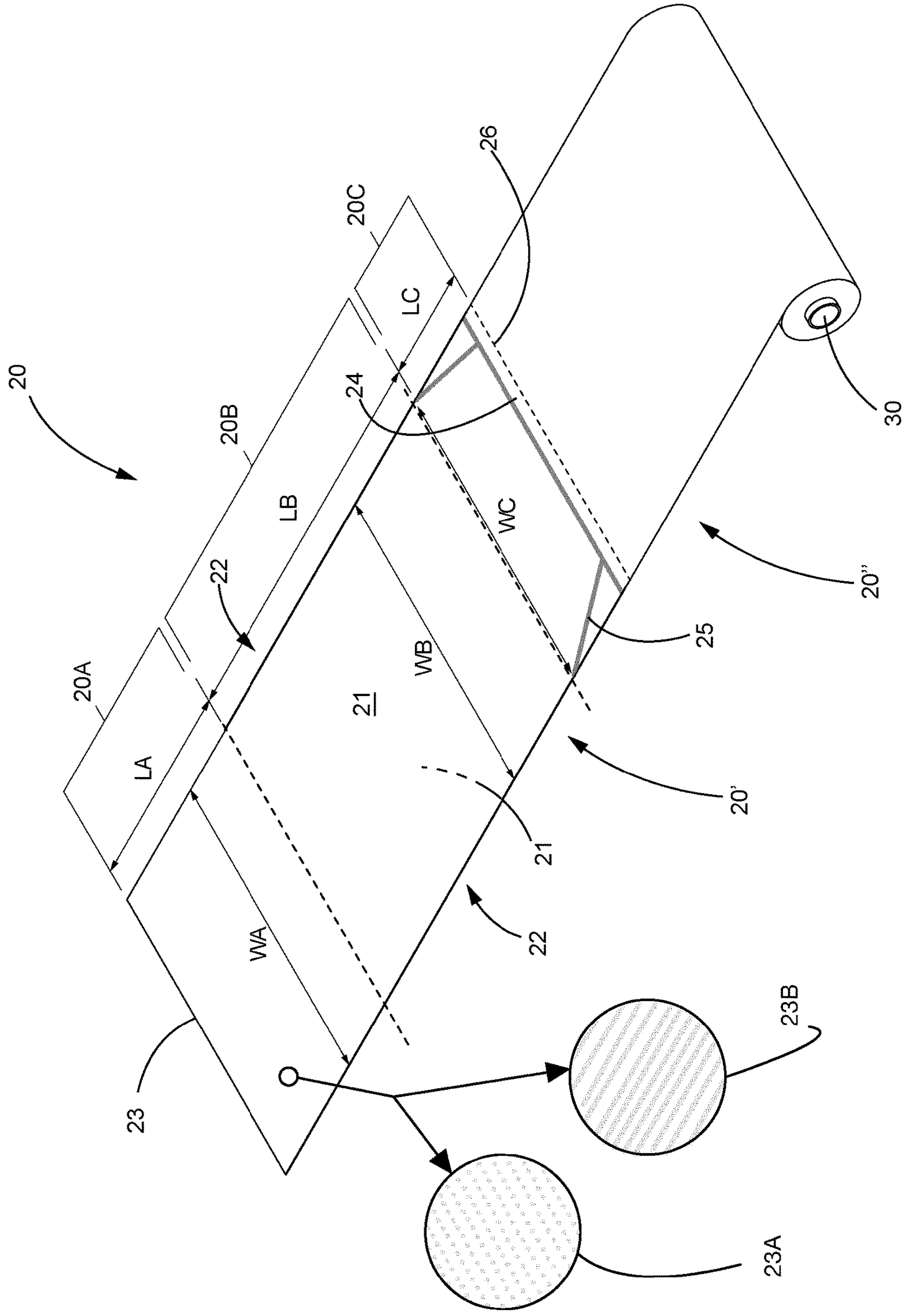
FIG. 1 is a perspective view of a bag roll in accordance with an embodiment of the present disclosure.
Figure 2:
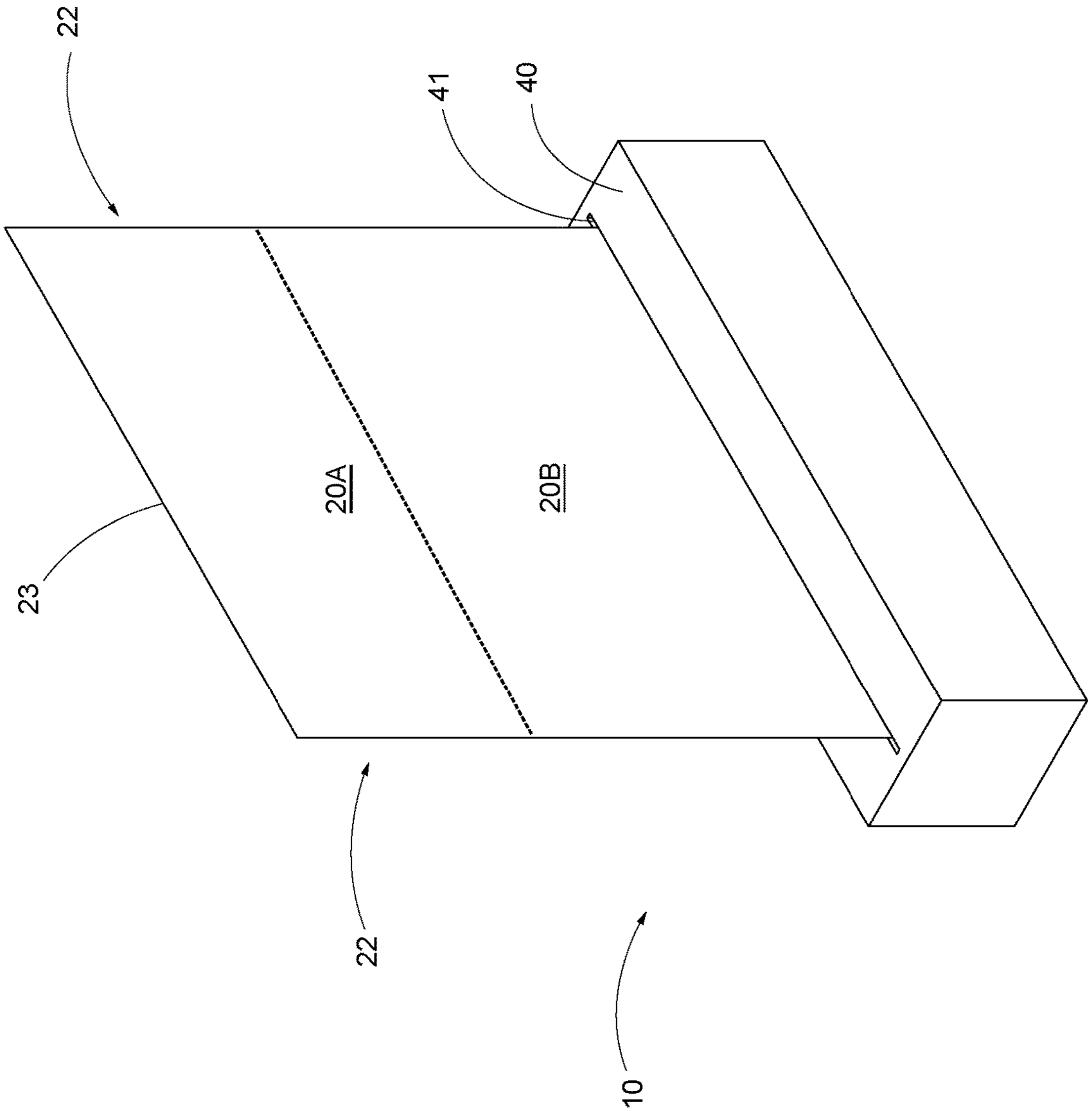
FIG. 2 is a perspective view of a bag roll cassette in accordance with the present disclosure, including for instance the bag roll of FIG. 1.
Figure 7:
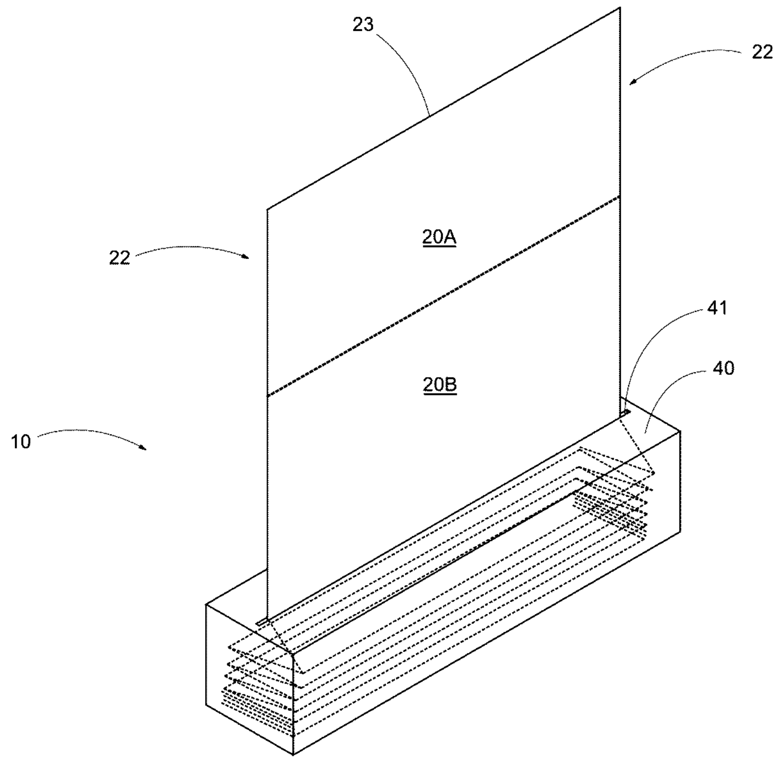
FIG. 7 is a perspective view of a film-dispensing cassette with bags such as in the bag roll of FIGS. 1 and 6, in another accumulated configuration.

Referring to the drawings and more particularly to FIGS. 1 and 2, a bag roll cassette is generally shown at 10 (FIG. 2). The bag roll cassette 10 may have a bag roll 20, rolled onto a tube 30 (as shown in FIG. 1), and inserted into a cassette body 40. The bag roll 20 in accordance with the present disclosure may also be with or without the tube 30 and/or the cassette body 40. While the figures show a bag roll 10, the bags of any of the figures may be provided individually, i.e., not part of a roll, or in a zig-zag pattern (fanfold) (FIG. 7).

The bag roll 20 is shown in greater detail in FIG. 1. The bag roll 20 may be made of a film of plastic materials. For example, depending on the contemplated use, the plastic material may be of plastics such as polyethylene (LDPE, LLDPE or HDPE), bioplastics, polylactic acid, to name a few of numerous possible materials. It is also contemplated to add functional layers to the plastic film, such as ethylene vinyl alcohol (EVOH), for the film to form an odor barrier, or a nylon layer to reinforce the bag. The film may also be biodegradable and/or compostable material, such as starch-based or plant-based materials. As detailed below, portions of the bag roll 20 may be made of different materials, such as different plastic materials, whereby different mechanical properties (e.g. different levels of stretchability, elastic modulus, tensile strength, elongation at break, etc.), chemical properties (e.g., fluid impermeability/permeability, such as gas impermeability or liquid impermeability, etc.) and/or other properties as those set forth above may be obtained at selected locations/sections along the bag roll 20, lengthwise and/or widthwise.

The bag roll 20 may be in the form of a length of tubular film, with weld lines and tear-off perforations delimiting a plurality of bags interconnected end to end, as shown as 20', 20" and so on. The tubular film may be accumulated on a roll, in a zig-zag pattern, etc. The bag roll 20 may consequently appear to be a continuous sheet as in FIG. 1 due to the thinness of the film, though the bag roll 20 has a pair of panels 21 overlaid onto one another, and joined at side edges 22. In an embodiment, this is referred to as a flattened two-fold condition of the bags: the bags have two folds, i.e., one at each side edge 22, and no gusset. Although the bags in the bag roll 20 could have gussets in accordance with the present disclosure, the transverse dimensions of the bag may be described herein as being in the flattened two-fold condition. This may be construed as meaning that, even if the bag roll 20 has gussets, the dimensions are for the transverse dimensions of the bag as if it were in a flattened two-fold condition. Even though the bags described herein may not be packaged or sold in the flattened two-fold condition (it may have even more folds, e.g., folded on itself), the flattened two-fold condition is the condition in which the bags are laid flat on a surface so as to have two lateral folds—two side edges—, between the top edge and the bottom edge. Moreover, reference is made to the bag as being unstretched. This may be construed as meaning that the bags are in their initial condition on the bag roll 20 prior to having a user handle the bags prior to installing same on a disposal unit, which may entail some elastic deformation or plastic deformation. The bags in their initial condition on the bag roll 20 may have been plastically prestretched in manufacturing, but in spite of such prestretching their condition on the bag roll 20 is said to be unstretched.

The side edges 22 of each bag extend from a top edge 23 to a bottom edge 24 of each bag, such as bag 20'. In the end-to-end connection of the bag roll 20, the bags are interconnected such that a bottom edge 24 of a leading bag is connected to a top edge 23 of a trailing bag in the bag roll 20, in contrast to bag rolls in which bottom edges or top edges of adjacent bags are interconnected. When laid flat, i.e., in a flattened two-fold condition, the bags 20', 20", etc., of the bag roll 20 have a constant width. For example, as shown, the side edges 22 are parallel to one another on the full length of the bags from the bag roll 20. However, it is also considered to provide a taper in the bags, from the top edge 23 to the bottom edge 24.

The bags may have two, three or more distinct sections. As shown, each bag, such as bag 20', has a top section 20A, which may be referred to as a hooking section, a middle section 20B, which may be referred to as a disposal section and a bottom section 20C, which may be referred to as a closed end section. The middle section 20B or the bottom section 20C may be optional, in that the middle section 20B and the bottom section 20C may be considered as a same section, for instance when dimensions and/or properties of those sections are the same from the top section 20A to the bottom end of the bag 20'. In other words, the middle section 20B and the bottom section 20C may not have distinctive features one relative to the other when it comes to their stretchability and/or dimensions, e.g. width, or other properties. As shown, the top section 20A, middle section 20B and bottom section 20C extend sequentially from the top edge 23 to the bottom edge 24, here without separation lines. However, at least the top section 20A has different mechanical and/or chemical properties than that of the middle section 20B and/or the bottom section 20C. The top section 20A has a greater stretchability than the middle section 20B and/or the bottom section 20C. For instance, when the bag 20' is opened at a maximum open diameter, the top section 20A may be stretched non-permanently (i.e. elastically), or stretch plastically without tearing, at a given tensile load in a direction transverse to a length of the bag 20', which may correspond to a circumferential or peripheral direction of the bag 20', to expand an open diameter of the bag 20' at the top section 20A, while the middle section 20B remains in the unstretched condition if the same given tensile load were applied thereto. In at least some applications for the bag 20', such stretching of the top section 20A may allow a proper hooking of the top section 20A on the bag support 56 of the disposal unit 50 (FIG. 3, described in further detail below), and less to no stretching of the middle section 20B may allow for a better control of the maximum volume and/or space occupied by the bag 20' within the disposal unit 50 when the bag 20' is packed with waste.

In at least some embodiments where the bag 20, 20' may stretch elastically, in a stretched (elastically) condition, as the top section 20A is installed and taut on the bag support 56 (e.g. partially folded over the tubular bag support 56, as described with further details below with reference to FIG. 4), the top section 20A may apply a contraction force (due to elastic recovery) against the bag support 56, which may secure the top section 20A of the bag 20, 20' on the bag support 56, without additional components (e.g. drawstrings, bands, clips, clamps, etc.). For use in a disposal unit 50 as disclosed herein, for instance, a proper balance between bag securing force and manual stretching with limited hassle (or hassle-free) by a user may be contemplated. The top section 20A imparting a desired level of contraction force may provide retention of the bag on the bag support 56 when the bag 20, 20' is packed with waste (e.g. up to 4 kg of waste) and pulled downward by the waste weight. The elasticity of the top section 20A may allow manual stretching of the bag 20, 20' with limited hassle while installing and/or removing the bags on the bag support 56. Mechanical retention or bag securing force at the top section 20A may be provided by the geometry and/or shape of the tubular bag support 56 without such contraction force due to elastic recovery in some embodiments. In such cases, when the bag 20' is packed with waste (e.g. up to 4 kg of waste) and pulled downward by the waste weight, mechanical retention may still be obtained by features of the tubular bag support 56 engaging with the top section 20A.

In at least some embodiments, a difference of stretchability of the top section 20A versus the middle section 20B and/or the bottom section 20C may be defined by a difference in elasticity of the tubular film in the top section 20A versus in the middle section 20B and/or the bottom section 20C. For example, in an embodiment, the top section 20A is made of elastically stretchable film while a remainder of the bag 20 is not. The top section 20A may define an elastic band forming part of the bag, when compared to a remainder of the bag 20'. The top section 20A may be in a variant LLDPE. In contrast, a remainder of the bag 20' may be made of a film that does not elastically stretch when waste is received in it, or when tension force is applied to that lower part of the bag. A difference in elasticity may be obtained, for example, by having a thickness of the top section 20A smaller than that of the middle section 20B and/or bottom section 20C. In some embodiments, for instance, the top section 20A may have a thickness between 50% and 95% that of the middle section 20B, in some particular cases between 75% and 95%, and in some even more particular cases between 85% and 95%. As another example, an elastic band of material may be embedded between layers of material forming the top section 20A. Depending on the manufacturing process, the top section 20A may be welded to a remainder of the bag 20, such as via ultrasound welding. Adhesive may be used as another possibility.

As yet another example, a difference in elasticity and/or stretchability between the top section 20A and the middle section 20B may be obtained by a surface treatment applied to the top section 20A and not applied to the remainder of the bag 20. The surface treatment may include one or more surface features. Examples of such surface treatment are shown in FIG. 1 at 23A and 23B.

As shown in FIG. 1, the exemplary surface features 23A are defined by a surface pattern such as by embossed, prestretched or deformed areas of the tubular film in the top section 20A. In some embodiments, the surface patterns may define embossed areas surrounded by smooth surface areas delimiting the contour of the embossed areas. In an embodiment, the surface patterns may include one or more peripherally extending lines of embossed, prestretched or deformed areas spaced apart from each other by untreated areas (e.g., non embossed, non prestretched, non deformed), to force elastic and/or plastic deformation of the top section 20A to occur upon application of a tensile load in a direction transverse to the length L of the bag 20 in areas defined by the surface patterns. In an embodiment, the surface patterns may include an array of dimples (rounded, diamond shaped, honeycomb shaped, for instance) formed into the tubular film.

As shown in FIG. 1, the exemplary surface features 23B are defined by corrugations extending in a direction of the tubular film length (or bag length). As shown, the corrugations may extend from the top end along all of the length LA of the top section 20A, without extending in the middle section 20B. In other embodiments, the corrugations may extend in a peripheral direction, i.e. a direction transverse to the length L of the bag 20. In yet other embodiments, the surface features may include corrugations extending in more than one direction, such as in the direction of the length L of the bag and the direction transverse to the length of the bag. The corrugations may be of even width or uneven width, depending on the embodiments. The corrugations and interstitial spaces inherent to the corrugations may defined a pattern of adjacent thinner and thicker areas of the tubular film.

The exemplary surface features 23A and 23B show some possibilities, though other surface features may be contemplated to enhance stretchability in the top section 20A as opposed to the other sections of the bag 20. The surface features 23A, 23B may be evenly or unevenly distributed in the top section 20A, spread on the entire surface of the top section 20A or defined in selected locations thereof, for example.

Surface features may be obtained by delimiting zones in the top section 20A having less material layers than other zones, in embodiments where the tubular film include a plurality of layers of materials. As such, stretching may be facilitated in some zones of the top section 20A relative to other zones of the top section 20A.

As a further example, such surface treatment may be, for instance, applied to the middle section 20B and/or the bottom section 20C only, i.e. the top section 20A devoid of such surface treatment, such that the middle section 20B to decrease its/their stretchability.

The surface treatment and/or surface features described herein may be obtained by pressing the tubular film (or sections thereof) between complementary press plates, or between rollers of a rotary press, for instance. Such rollers may be knurled or ribbed rollers to imprint the surface features, mechanically, in the material of the tubular film. Such process may be performed with or without heating the plates or rollers, e.g. by a cold rolling process. Other manufacturing processes may be contemplated, such as by heating portions of the tubular film to define the surface features, for example, by rollers or flat embossing.

In at least some embodiments, the tubular film in the top section 20A has an elongation at break greater than that of the middle section 20B, i.e., permissible elongation until the film breaks. For instance, in an embodiment, the elongation at break of the tubular film in the top section 20A is between 105% and 200% of that of the tubular film in the middle section 20B. Additionally or alternatively, the tubular film in the top section 20A may have a yield strength smaller than that of the middle section 20B. That is, at a given tensile load exerted on the tubular film in the top section 20A, for instance 10 pounds, the top section 20A may stretch, either elastically or plastically without tearing, whereas the middle section 20B may not. For instance, in some cases, the yield strength of the tubular film in the top section 20A is between 50% and 95% of that of the middle section 20B. The difference in yield strength between the top section 20A and the middle section 20B may be selected to as to limit a propensity of undesirably stretching the middle section 20B as the top section 20A is being stretched. Additionally or alternatively, the tubular film in the top section 20A may have an elastic modulus that is smaller than that in the middle section 20B. For instance, in some cases, the elastic modulus of the tubular film in the top section 20A versus in the middle section 20B has a ratio between 3:10 and 9:10, where in some cases the ratio is between 4:10 and 8:10, and where in some cases, the ratio is between 5:10 and 7:10. elastic modulus of the tubular film in the top section 20A versus in the middle section 20B may be lower than 3:10 in other embodiments. In embodiments where the tubular film, either a section or an entirety thereof, include layers of different materials, the elastic modulus or yield strength is the "compounded" elastic modulus or yield strength of the tubular film including the combined layers of materials. The elongation at break and other properties discussed above may be taken in a circumferential or peripheral direction, transversely to the tubular film length. Measurement of those properties in various sections of the tubular film may be made using standardized test method(s) as set forth in the ASTM standards, as applicable, for instance.

While the top section 20A and the middle section 20B are compared above in difference in properties, the top section 20A may be compared with the bottom section 20C. In at least some embodiments, the comparative properties and values discussed above with respect to top section 20A and middle section 20B may be the same when the top section 20A and the bottom section 20C are considered. For instance, this may occur in embodiments where the middle section 20B and the bottom section 20C have the same composition and/or mechanical properties.

In an embodiment, the tubular film in the top section 20A and in the middle section 20B, includes a layer of EVOH for the film to form an odor barrier. Indeed, the layer of EVOH may extend in the bottom section 20C to maximize the odor barrier. In other embodiments, the layer of EVOH may be omitted in the top section 20A but present in the middle section 20B and in the bottom section 20C. When full of waste, the bags, such as bag 20', may be closed by knotting the top open end of the bag 20' with the top section 20A remaining above the knot (i.e. top section 20A not in contact with the waste), hence odor control in the top section 20A may be optional, depending on the contemplated use. In a particular embodiment, the tubular film in the top section 20A includes LLDPE and the tubular film in the middle section 20B and the bottom section 20C includes HDPE, with or without one or more layers of LLDPE.

In an embodiment, it is desired to have only the top section 20A adapted to stretch, or to have the top section 20A substantially more stretchable than the middle section 20B (and/or bottom section 20C), in contrast to having the whole bag 20', including the middle section 20B and the bottom section 20C to stretch or otherwise deform (elastically or plastically), while packing the bag with waste. This may facilitate removal of the bag from the disposal unit 50, as further described later. Such difference in stretchability, as discussed above, may be obtained by different thicknesses, different materials, different number of layers of materials in one or more sections of the bag, and/or surface treatment applied to selected sections of the tubular film, such as only to the top section 20A, and not to the middle section 20B and/or bottom section 20C for instance.

In the depicted embodiment, the bags are without tapering, and thus transition directly from the top section 20A to the middle section 20B. There may be a constriction (bottleneck) intermediary section between the top section 20A and the middle section 20B as another possibility.

In the depicted embodiment, the bags of the bag roll 20 are straight from the top edge 23 to the bottom edge 24, with a constant width. For clarity, the width described herein is the flat width as in FIG. 1, i.e., with the bags of the roll in a flattened two-fold condition with the panels 21 coplanar. Though the moniker "straight" is used in this context, the side edges may taper. The expression "straight" is used herein for differentiating purposes, in a non-limitative manner. For instance, in other embodiments, the side edges 22 at the top section 20A, although shown as straight and parallel in the embodiment of FIGS. 1 and 2, may taper toward the bottom edge 24 while still being considered "straight". Likewise, the side edges 22 at the middle section 20B, although shown as straight and parallel in the embodiment of FIGS. 1 and 2, may taper toward the bottom edge 24 while still be considered "straight". As yet other embodiments, the side edges 22 may taper continuously from the top edge 23 to the bottom edge 24, at a continuous angle, or with two (or more) different angles, i.e., one for section 20A, another for section 20B, and yet another for section 20C. In another embodiment, the bag 20' (whether or not part of the roll 20) has the side edges 22 at the top section 20A parallel or quasi-parallel to one another, to then taper beyond the top section 20A.

The top section 20A has a width WA and the middle section 20B has a width WB, with the widths WA and WB substantially constant throughout most or all of the sections 20A and 20B, respectively, in a flattened two-fold condition, prior to installation of the bag. The side edges 22 in the top section 20A and the middle section 20B are parallel as in FIG. 1. If the sections 20A and 20B taper toward the bottom edge 24 (not shown), the top section 20A has a minimum width WA that is greater than the mean width WB taken along the middle section 20B. For example, the width ratio is as follows: 0.60WA≤WB(mean)≤0.99WA. In another embodiment, the width ratio is as follows 0.65 WA≤WB (mean)≤0.85WA.

The bags, such as bag 20', have a length L that may be segmented as LA, LB and LC, to be representative of the height of sections 20A, 20B and 20C, respectively. In accordance with an embodiment, LB is at least 3 times the length of LA, i.e., LB>3LA. Stated differently, the length LA may be smaller than a third of the length LB. In an embodiment, such relative dimensions of LA and LB may correspond to having the length LA between 5% and 20% that of the length LB (or LB+LC). In a particular embodiment, the length LA is between 5% and 10% of the length LB (or LB+LC). Minimizing the dimension of LA and/or maximizing the length LB with respect to the overall length L of the bag 20' may allow for a greater volume of the bag 20' dedicated to receiving waste without (or without substantially) stretching while having a sufficient length LA of the top section 20A to facilitate the installation of the top section 20A on the tubular bag support 50. In accordance with another embodiment including the bottom section 20C, LB+LC is at least 3 times the length LA, LB+LC>3LA. The length LA may be relatively small with respect to LB and/or LB+LC. In use with a waste disposal unit, the top section 20A may not extend beyond the tubular bag support 56, such that waste or other objects inside the bag 20' may be in the volume of the bag surrounded by either one or both of the middle section 20B and bottom section 20C, and not surrounded by the top section 20A.

LA may be separated into LA1 and LA2 if the top edge 23 defines a concavity or convexity as detailed below. LA2 is the portion of the section 20A below such concavity or convexity (FIGS. 5B and 5C).

Figure 5:
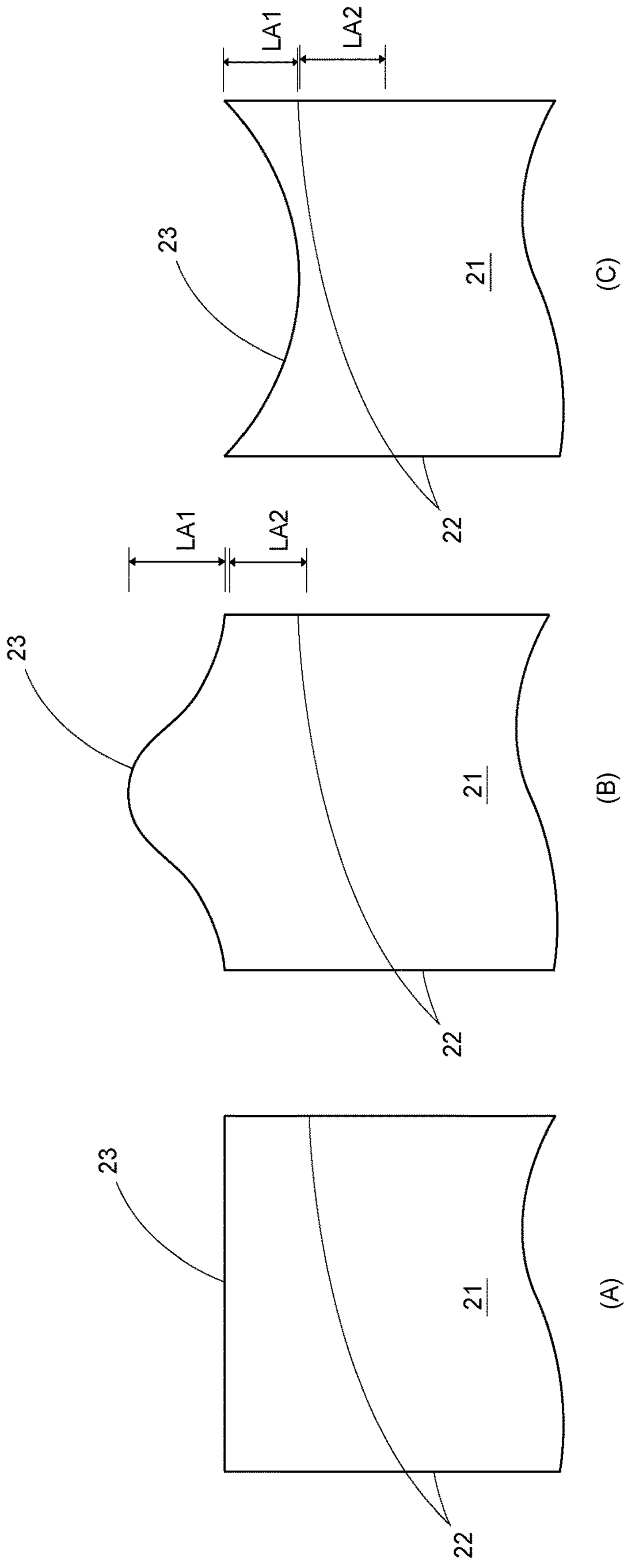
FIGS. 5A to 5C are plan views of top edge outlines for bags of the bag roll of FIG. 1.

Referring to FIGS. 1 and 5A to 5C, the top edge 23 may have different outlines. In FIG. 1, the outline of the top edge 23 is a straight outline. Exemplary outlines are shown in FIGS. 5A to 5C, such as (A) a straight outline, (B) a convex sine waveform outline, (C) a concave arc outline. As the bags of the roll 20 are a pair of overlaid panels 21 as in FIG. 1, when the panels 21 are separated from one another to open the bag at the top edge 23, the non-straight outlines of FIGS. 5B and 5C, each form a pair of flaps that may be used to form a knot to attach the bag closed. As the bags are interconnected end to end in the bag roll 20 with adjacent bags connected bottom to top as described above, the bottom edge 24 has a shape that is complementary to the top edge 23. Stated differently, if the outline of the top edge 23 is a concave sine waveform, the bottom edge 24 is a convex sine waveform, etc.

As shown, a weld seam (or simply "seam") 25 extends from one of the side edges 22 to the other to connect the panels 21. The weld seam 25 may be created by any appropriate welding or adhering method, such as heat welding, etc., whereby reference is made herein as a weld seam, although other types of jointing is contemplated, such as gluing. As shown, the weld seam 25 includes a portion that defines the bottom closed end of the bags 20', 20", etc.

In the embodiment of FIG. 1, the side edges 22 of the top section 20A and of the middle section 20B are the two folds in the tubular film as described above for the flattened two-fold condition, the folds defining a boundary between the panels 21. In FIG. 1, the bottom section 20C includes weld seams 25 extending at an angle from the weld seam 25 extending along the bottom edge 24 to the side edges 22. For simplicity, the expression "weld seams 25" may be used in the plural, though a single continuous weld seam 25, including a plurality of connected portions may be present. When the weld seams 25 define a taper as in FIG. 1, the section 20C with such taper has a length LC that is a fraction of the length LB, e.g., 3LC<LB, for instance so as not to reduce the volume of the bag excessively.

When laid flat, i.e., in a flattened two-fold condition, the bags 20', 20", etc., of the bag roll 20 have a constant width. For example, the side edges 22 are parallel to one another on the full length of the bags from the bag roll 20. However, due to the presence of the weld seams 25 in the bottom section 20C inwardly offset from the edge segments 22C, the dimension of the inside of the bag at WC—for instance in terms of inside diameter—reduces in the bottom section 20C. As shown, in the bottom section 20C, the weld seams 25 define a tapering section, i.e. a reduction of the inside diameter of the bag, towards the bottom edge 24. Such reduction of the inside diameter defines a convergence of the weld seams 25 in the bottom section 20C towards the weld seam 25 extending along the bottom edge 24 the bags, such as shown on bag 20'. The tapering of the inside diameter of the bags in the bottom section 20C may eliminate (at least limit) a propensity of the waste inside the bags to accumulate in bottom corners of the bags, if the bottom section 20C had no tapering. At least in some instances, accumulation of waste in such bottom corners may hinder the removal of the bag packed with waste through the top of a disposal unit (detailed below).

Flaps are formed to the exterior of weld seams 25 in the bottom section 20C. As shown, the weld seams 25 (or the portions of the continuous weld seam 25) extend angularly with respect to the side edges 22 of the bottom section 20C to form the tapering of the inside open diameter thereby defining flaps. As seen, triangular shaped flaps extend along the weld seams 25 along the side edges 22 of the bottom section 20C of the bag 20'. The flaps may have other shapes such as curved chevron, etc. In all embodiments described herein, there may be a single side portion for the weld seam 25 (i.e., only one extending along one side edge 22 of the bottom section 20C) as opposed to the two side portions shown in the figures, and yet achieve the narrowing described herein. The bag 20' of FIG. 1—or of all figures—may also come as individual units, i.e., not as part of a bag roll.

Therefore, in accordance with an embodiment, the weld seam 25 is made periodically in a straight continuous tube—a continuous tubular body—in a flattened two-fold condition. In at least some embodiments, such as shown, the weld seams 25 define the closed bottom end of the bags, and a tapering inside dimension in the bottom section 20C of the bags. In some embodiments, the weld seam(s) 25 may extend along one of the middle edge segment 22B while the other middle edge segment 22B is defined, partially or entirely, by a fold, as described above for the flattened two-fold condition. This may apply similarly to the top edge segments 22A. In some other embodiments, the weld seam(s) 25 may extend along both side edges 22 (i.e. top segments 22A and/or middle segments 22B). The weld seam(s) 25 may extend to the top edge 23, or to the top section 20A, as different possibilities.

Tear-off perforation lines 26 are punctured at the junction between the bottom edge 24 of a first bag, the leading bag such as 20', and the top edge 23 of the subsequent bag in the bag roll 20, the trailing bag such as 20". The tear-off perforation line 26 may be defined by a series of spaced-apart punctures along an outline emulating that of the bottom edge 24 and the top edge 23. The tear-off perforation line 26 is adjacent to the weld seam 25, and forms a weakened portion of the bag roll 20, causing a separation of one of the bags, such as 20' in FIGS. 1 and 2, as a result of a tearing action. As shown, the tear-off perforation line 26 at a junction between a leading bag and a trailing bag, such as bag 20' and bag 20", is offset from the weld seam 25 extending along the bottom edge 24. A band of material extending between the bottom edge 24 and the tear-off perforation line 26 may be referred to as a flap, as discussed above. In some embodiments, such flap between the bottom edge 24 and the tear-off perforation line 26 may be absent, or minimal. This may be the case where the tear-off perforation lines, such as at 26, are aligned or quasi-aligned with the weld seams 25 forming the closed bottom end of the bags, for instance. In an embodiment, the tear-off perforation lines 26 and cut outs at the sides of the weld seams 25 are done by die cutting.

Referring to FIG. 2, the bag roll 20 may be inserted into a cassette body 40, being for example a receptacle from the bag roll 20. The cassette body 40 may have a slit 41 or like opening, such as a top opening, through which a free end of the bag roll 20 extends. The cassette body 40 is shown as having a cuboid geometry, although other shapes are considered as well, such as a rectangular prism, a cylinder, etc.

Figure 3:
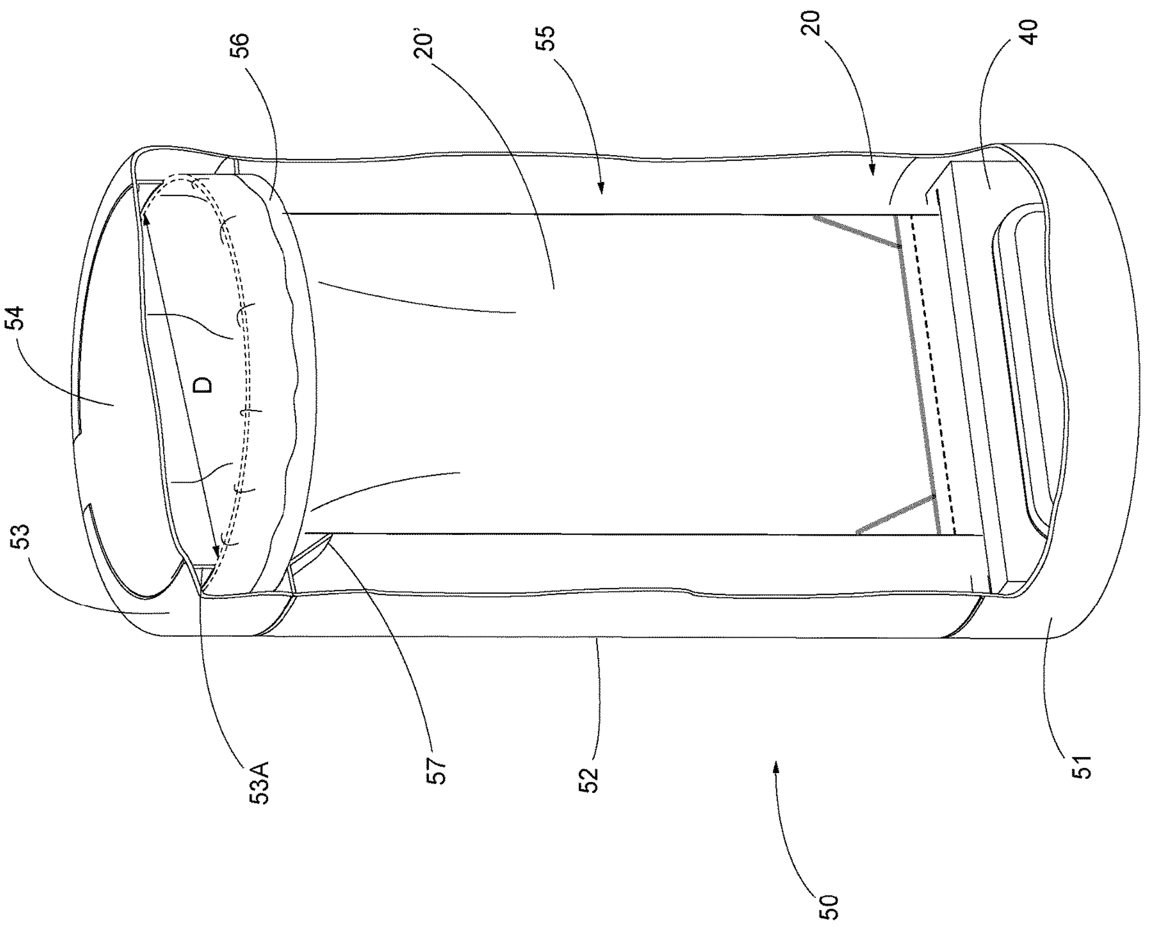
FIG. 3 is a perspective view of the bag roll cassette of FIG. 2 in a fragmented waste-disposal unit.
Figure 4:
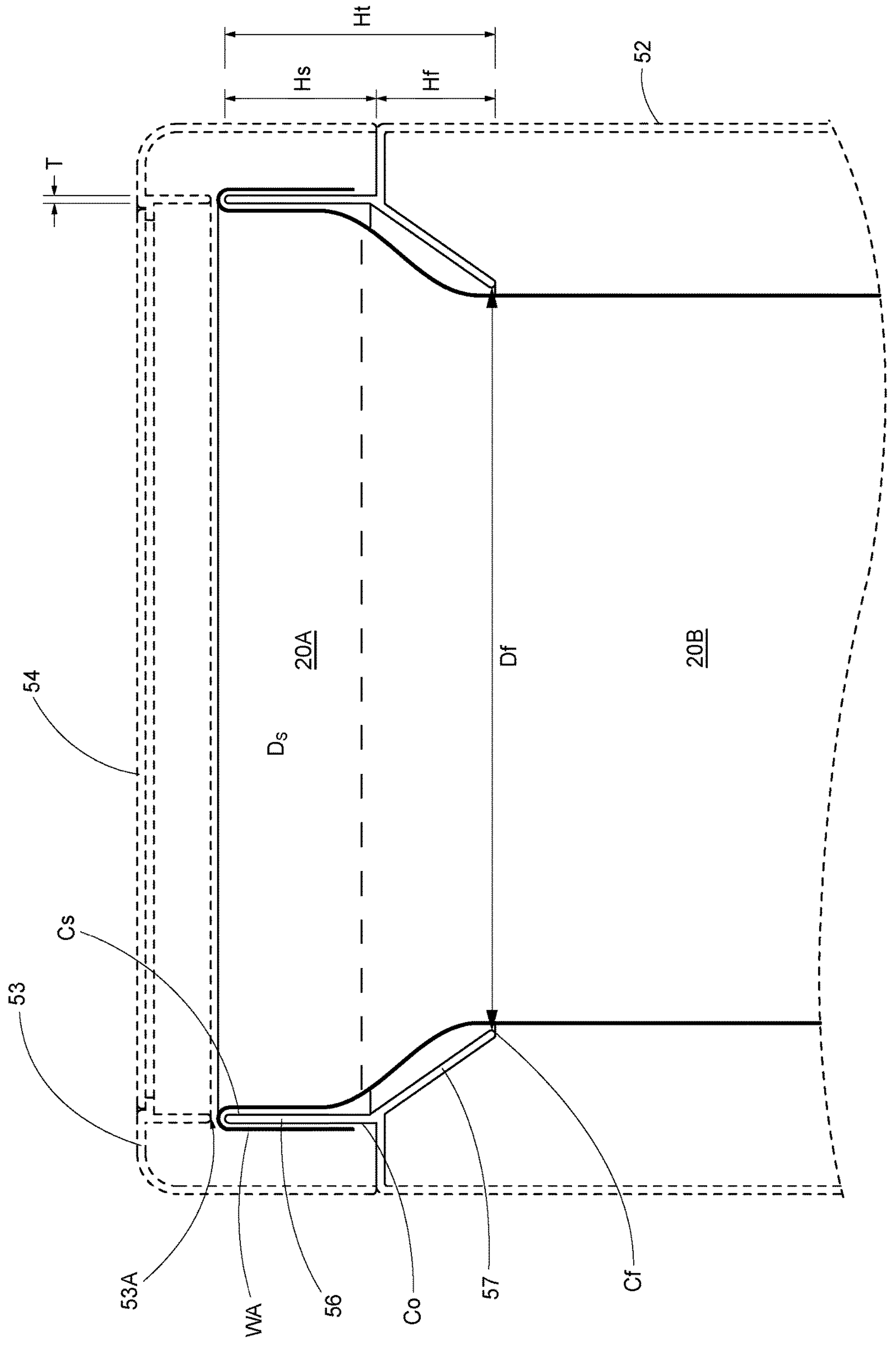
FIG. 4 is a sectional view of the bag roll cassette and waste-disposal unit of FIG. 3.

Referring now to FIGS. 3 and 4, the bag roll 20 as part of the cassette 10 (FIG. 3), or as a bag roll 20 alone (FIG. 4), i.e., without the cassette body 40, is received in a disposal unit 50. The expression "disposal unit" is used herein as encompassing a garbage, a diaper pail, a compost, a recycling bin, a litter pail, etc. The disposal unit 50 may have a base 51, upon which projects an upstanding wall(s) 52. The upstanding wall 52 is in the form of a cylindrical tube in FIG. 3, but may have other shapes, with for example a square section, an oval section, etc. Although not shown, a hinged door may be part of the upstanding wall 52 to provide access to an interior of the disposal unit 50. As another possibility, the upstanding wall 52 may be raised out of engagement with the base 51. Various connection configurations may be present, such as quick connect mechanisms, fasteners, etc. A cover 53 is mounted atop the upstanding wall 52. The cover 53 may define a central opening with a downwardly projecting rim 53A that may come into close proximity or in contact with a bag to ensure the bag remains hung to the disposal unit 50, as in FIG. 4. Moreover, the central opening of the cover 53 shown in FIG. 3 may be shut closed by a trap door 54 (also known as lid), hinged to a remainder of the cover 53. 53A The trap door 54 opens or closes the top access to an inner cavity 55 of the disposal unit 50. It may be biased by a spring, or operated by a pedal mechanism, etc. Also, although not shown, a closing mechanism of any appropriate form (translation, rotation) may be provided in the inner cavity 55 or other location on the disposal unit 50 to squeeze the bag shut.

The disposal unit 50 has a tubular bag support 56 adjacent to the cover 53. In an embodiment, the annular bag support 56 may have any appropriate shape, and is shown as being cylindrical, with a circular cross-section. Other possible cross-sectional shapes include, non-exhaustively, square, rectangular, oval, squircle, pentagon, hexagon, octagon, etc. Accordingly, the expression "tubular" in tubular bag support 56 covers these multiple shapes. The tubular bag support 56 has a height $H_S$, an inner circumference $C_S$, an outer circumference $C_O$ and a wall thickness T. In the embodiment of FIG. 3, in which the tubular bag support 56 is circular with an inner diameter $D_S$, the inner circumference $C_S$ is equal to $\pi D_S$. The outer circumference $C_O$ may be expressed as $\pi(D_S+2T)$. In another embodiment, the disposal unit 50 has two or more hooks acting as bag support 56. FIG. 4 may be interpreted as having two elongated straight or curved hooks 56 shown in cross section. Such hooks are also present in the exemplary waste disposal device described in international patent application no. PCT/CA2019/051346, the entire contents of which is incorporated herein by reference. In embodiments where such hooks are present, the height Hs may be the height Hs of the hooks, taken from a base of the hooks to a protruding end or edge of the hooks. The dimensions Ds, Cs Co and T discussed above may correspond respectively to a maximal distance between opposite hooks (Ds), an outline extending along the inner surface (facing inwardly towards the central opening of the tubular bag support 56) and interconnecting ends of the opposite hooks (Cs), an outline measured as a chord length forming a closed loop about the hooks (Co), and the maximal thickness of each hook (T).

A funnel 57 may optionally be located below the tubular bag support 56 in the upstanding orientation of the disposal bin 50, but may also be absent. The funnel 57 has a central opening that may have the same shape as the tubular bag support 56. Therefore, in FIG. 3, the funnel 57 has a frusto-conical shape with a central circular opening have a circumference $C_F$ and inner diameter $D_F$. The height of the funnel 57 is shown as being $H_F$. In an embodiment, the funnel 57 is immediately below the tubular bag support 56, whereby a height $H_T$ from a top edge of the tubular bag support 56 to the edge of the central opening of the funnel 57 is as follows: $H_T=H_F+H_S$. In an embodiment, the funnel 57 is spaced apart from the tubular bag support 56, whereby $H_T$ may include the spacing value along a vertical axis of the bin 50. The funnel 57 centers waste or like items deposited into the deployed bag, for the bag to remain generally compact when filled. The funnel 57 may therefore facilitate the removal of the filled bag from the top of the disposal unit 50, i.e., by an upward pull of the user, in some embodiments. In embodiments where the disposal unit 50 is as described in international patent application no. PCT/CA2019/051346, for instance, the maximal distance between opposite hooks may be greater than that of a central opening defined by the tubular bag support 56 through which the bag extends in the interior volume of the disposal unit 50.

As observed in FIGS. 3 and 4, the bag roll cassette 10 or bag roll 20 are disposed in a bottom of the disposal unit 50. In an embodiment, a connection configuration is provided for the bag roll cassette 10 or the bag roll 20 to be retained by the base 51, although the bag roll cassette 10 or the bag roll 20 may simply be deposited on the base 51 and remain in the bottom of the disposal unit 50 by gravity. The free end of the bag roll 20 extends upwardly, for the top section 20A of the bag 20' to be partially folded over the tubular bag support 56. In doing so, the top open end of the bag 20' is held open, for objects to be dumped into the bag 20'. A remainder of the bag 20', including middle section 20B and the bottom section 20C, extends into the inner cavity 55 of the bin 50. While the bag 20' is attached to the tubular bag support 56, it remains connected to the bag roll 20 as shown in FIG. 3.

In order for the bag 20' to remain hung to the tubular bag support 56, the bag 20' may have a given unstretched transverse flattened two-fold width WA in the top section 20A, expressed as follows: $0.9C_O/2 \leq WA \leq (C_O/2)$.

If the tubular bag support 56 is circular, the bag 20' will adopt a circular shape when hung to the tubular bag support 56, as in FIG. 3. The diameter D of FIG. 3 at the opening of the bag 20' in the unstretched condition can be expressed as $0.9\,(C_S/\pi+2T) \leq D \leq (C_S/\pi+2T)$. If the bag is not circular when deployed open, for instance if the tubular bag support 56 is not circular, the bag may comply with the following relation: $0.9\,POL/2 \leq WA \leq POL/2$, where POL is an outline of the tubular bag support 56 taken at a location where the top section 20A of the bag 20' is secured to the tubular bag support 56, and where WA is the unstretched transverse flattened two-fold width WA. In at least some embodiments, such location where the outline is measured is at the two or more hooks defined by the tubular bag support 56, as discussed above with respect to FIG. 4, where such outline may be measured as a chord length forming a closed loop about the two or more hooks. The top section 20A may then be stretched, elastically or plastically without tearing, to expand the diameter D and/or its top opening such that the top section 20A may be partially folded over the tubular bag support 56, then released to use the elastic recovery force to secure the top section 20A on the bag support 56 in embodiments where elastic recovery is possible, or simply mechanically retained by the two or more hooks engaging with the top section 20A.

In order to maximize a waste volume per length of tubular film, the bags of the roll 20 may comply with $LA<H_T+H_S$. The bags of the roll 20 may also comply with $1.5H_S \leq LA2 \leq 2H_S$ in the case of the bags having the outlines of FIGS. 5B and 5C, such that the subsection of length LA2 of section 20A of the bags covers at least half of the outer circumference of the tubular bag support 56 when taut. While the dimension LA2 is part of the above expressions related to Hs, the above expressions may also apply with the dimension LA1. If the bags have the outline of FIGS. 1 and 5A, the bags of the roll 20 may also comply with $1.5H_S \leq LA \leq 2H_S$ such that the section 20A of the bags covers at least half of the outer circumference of the tubular bag support 56 when taut.

The lack of (or limited) elasticity and/or stretchability in the middle section 20B and/or bottom section 20C when filled with waste may facilitate removal of a filled bag by upward pull in spite of the presence of the funnel 57 and closing mechanism (not shown) and/or the opening in the tubular bag support 56 through which waste may pass when disposed of in the bag 20'. Because of the funnel 57, the bags of the roll 20 may have a given unstretched transverse flattened two-fold width WB, expressed as follows: $WB \leq C_F/2$. As mentioned above, the middle section 20B may not be stretchable, or substantially less stretchable than the top section 20A. Therefore, even when filled with objects, the bags of the roll 20 may be pulled out of the bin 50 from the top, i.e., through the funnel 57 and tubular bag support 56. In doing so, a subsequent bag in the bag roll 20 is pulled upward and its top end is generally aligned with the tubular bag support 56 when the filled bag exits the bin 50 from the top. The filled bag is detached from the roll of bags 20 once out of the bin 50, and the subsequent bag in the roll 20 is hung to the tubular bag support 56 in the manner shown in FIG. 4. It is to be understood that the bags of the roll 20 may have a middle section 20B with a given unstretched transverse flattened two-fold width WB expressed as follows: $WB \leq C_S/2$, in embodiments of the disposal unit 50 without funnel 57. As such, a waste volume per length of tubular film may be maximized for a given disposal unit 50 without funnel 57, for instance.

Figure 6:
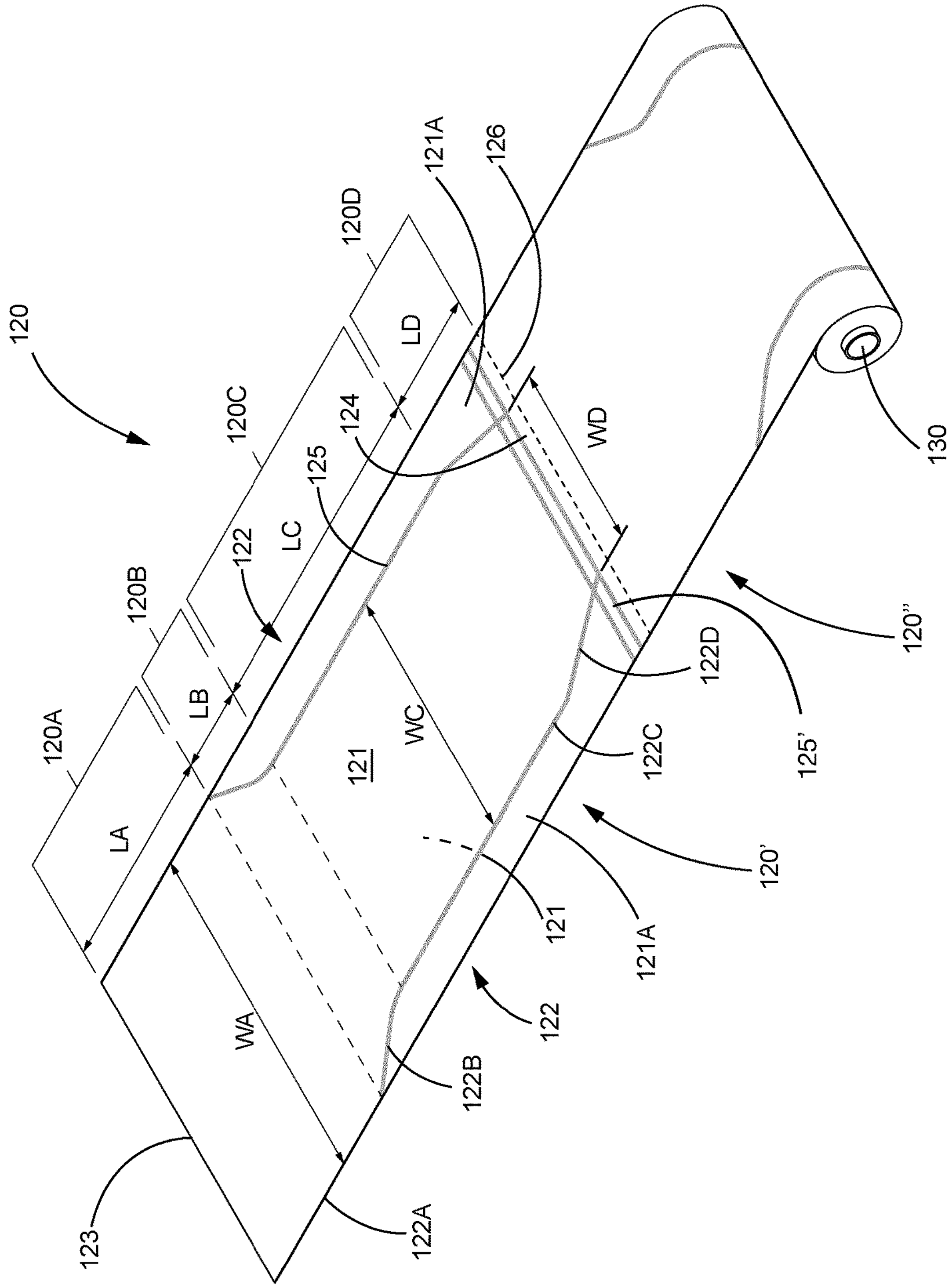
FIG. 6 is a perspective view of a bag roll such as in FIG. 1, in accordance with another embodiment of the present disclosure.

Referring to FIG. 6, another exemplary bag roll for the bag roll cassette 10 is generally shown at 120. Features with respect to the tubular film discussed above, including the different properties, such as stretchability elongation at break, yield strength, etc., may similarly apply to the exemplary bag roll of FIG. 6. As shown, the bag roll 120, is rolled onto a tube 130, and may inserted into a cassette body, such as the cassette body 40 of (FIG. 2). The bag roll 120 may also be with or without the tube 130 and/or the cassette body 40. The bag roll 120 may be made of a tubular film of plastic material. For example, depending on the contemplated use, the plastic material may be of plastics such as polyethylene (LDPE, LLDPE or HDPE), bioplastics, polylactic acid, to name a few of numerous possible materials. It is also contemplated to add functional layers to the plastic film, such as ethylene vinyl alcohol, for the film to form an odor barrier, or a nylon layer to reinforce the bag. The film may also be biodegradable and/or compostable material, such as starch-based or plant-based materials.

As shown, and as similarly described with respect to other embodiments, the bag roll 120 may be in the form of a length of tubular film, with weld lines and tear-off perforations delimiting a plurality of bags interconnected end to end, as shown as 120', 120" and so on. Any of the bags 120' may be available on its own and not part of a series or roll of interconnected bags. The tubular film may be accumulated on a roll, in a zig-zag pattern (fanfold) (FIG. 7), multifold, etc. The bag roll 120 may consequently appear to be a continuous sheet as in FIG. 6 due to the thinness of the film, though the bag roll 120 has a pair of panels 121 overlaid onto one another, and joined at side edges 122. In an embodiment, this is referred to as a flattened two-fold condition of the bags: the bags have two folds, i.e., one at each side edge 122, and no gusset. The side edges 122 may be folds as the bag may be made of a tubular film. Stated differently, the bag roll 120 may be a continuous tubular length of film, that is flattened and hence defines the side edges 122. Thus, even though a pair of panels 121 is described, the boundary between the panels 121 may be a fold line, forming the side edges 122. Although the bags in the bag roll 120 could have gussets in accordance with the present disclosure, the transverse dimensions of the bag may be described herein as being in the flattened two-fold condition. This may be construed as meaning that, even if the bag roll 120 has gussets, the dimensions are for the transverse dimensions of the bag as if it were in a flattened two-fold condition. Even though the bags described herein may not be packaged or sold in the flattened two-fold condition, the flattened two-fold condition is the condition in which the bags are laid flat on a surface so as to have two lateral folds—two side edges—, between the top edge and the bottom edge.

Moreover, reference is made to the bag as being unstretched. This may be construed as meaning that the bags are in their initial condition on the bag roll 120 prior to having a user handle the bags prior to installing same on a disposal unit, which may entail some elastic deformation or plastic deformation. The bags in their initial condition on the bag roll 120 may have been plastically prestretched in manufacturing, but in spite of such prestretching their condition on the bag roll 120 is said to be unstretched.

The side edges 122 of each bag extend from a top edge 123 to a bottom edge 124 of each bag, such as bag 120', with weld seams 125. In an embodiment, the side edges 122 are fold lines (i.e., resulting from a panel folded onto itself), though they could be weld seams. In the end-to-end connection of the bag roll 120, the bags are interconnected such that a bottom edge 124 of a leading bag 120' is connected to a top edge 123 of a trailing bag 120" in the bag roll 120, in contrast to bag rolls in which bottom edges or top edges of adjacent bags are interconnected. In order to give the side edges 122 the shape described above, the weld seam 125 may be a continuous seam extending from one of the side edges 122 to the other to connect the panels 121 laterally, or may have segments. This continuous seam 125 includes a portion that defines the bottom closed end of the bags 120', 120", etc. In the example of FIG. 6, the bottom closed end of the bag 120', 120", etc., includes a double seam portion 125' or segment. As shown, the double seam portion 125' has two parallel seams extending transversely to the tubular film length. There could be more than two seams, such that a multi-seam portion having more than two seams may be contemplated at the bottom closed end, in some embodiments.

Alternatively, the bags may have separate weld seams 125, i.e., the one(s) for the side edges 122 and the one for the bottom closed end. For simplicity, the expression "weld seams 125" is used in the plural, though a single continuous seam 125 may be present, in a U shape for example. The weld seams 125 may be interpreted as weld seam segments of a continuous weld seam 125. The seam 125 may be created by any appropriate welding or adhering method, such as heat welding, etc., whereby reference is made herein as a weld seam, although other types of jointing is contemplated, such as gluing. The weld seam 125 may also connect the panels 121 to define the bottom edge 124, i.e., the closed bottom end of bags of the bag roll 120. The weld seam 125 may also extend to the top edge 123, although in FIG. 6, the weld seam 125 ends at the larger top section 120A. In the embodiment of FIG. 6, the straight segments 122A of the larger top section 120A are the two folds in the tubular film as described above for the flattened two-fold condition, the folds defining a boundary between the panels 121. Therefore, in accordance with an embodiment, the weld seam 125 is made periodically in a straight continuous tube—a continuous tubular body—in a flattened two-fold condition, and portions of the film laterally outside of the weld seam 125 may be cut out, though they are shown as forming flaps 121A.

When laid flat as in FIG. 6, the bag of the bag roll 120 has a constant width. For example, the side edges 122 are parallel to one another on the full length of the bags from the bag roll 120. However, due to the presence of the weld seams 125, the dimension of the inside of the bag are reduced from the top edge 123 to the bottom edge 124 as described below. On the outside of the seams 125, the bags 120 define flaps 121A that do not form part of the interior of the bag, in that larger objects penetrating the bags 120 cannot fit into the flaps 121A. The side edges 122 are shown as each having an outline that may include a straight segment 122A adjacent to the top edge 123. Then, the weld seams 125 define a tapering segment 122B that may not be present, another straight segment 122C, and/or another tapering segment 122D. The tapering segment 122D extends from the straight segment 122C to the bottom edge 124 of the bags. The segments 122D may be straight lines or curved lines, tapering (i.e., reducing in cross-sectional dimension) from top to bottom. Though the moniker "straight" is used for segment 122C, the side edges may taper, from a maximum dimension of WC, all the way to the bottom edge 124. The expression "straight segment 122C" is used herein for differentiating purposes, in a non-limitative manner. Accordingly, the bags may have four different separate sections, though fewer combinations of separate sections may be present, namely a larger top section 120A, a tapering section 120B, a main storage section 120C and a narrower disposal section 120D, from top to bottom of the bags, such as bag 120'. In an embodiment, the bags are without the tapering section 120B and/or the straight segment 122C, and thus transition directly from the larger top section 120A to the narrower disposal section 120D. The straight segments 122A, although shown as being parallel to one another, may taper toward the bottom edge 124. Likewise, the straight segments 122C, although shown as being parallel to one another, may taper toward the bottom edge 124. As yet another embodiment, the seams 125 defining the side edges 122 may taper continuously from the top edge 123 to the bottom edge 124, at a continuous angle, or with two different angles, i.e., one for section 120A and another for section 120D, with no section 120B or 120C. In another embodiment, the bag 120' (whether or not part of the roll 120) has the straight segments 122A parallel or quasi-parallel to one another, to then taper beyond the larger top section 120A. For clarity, the width described herein is the flat width as described above, i.e., with the bags of the roll in a flattened two-fold condition with the panels 121 coplanar. The larger top section 120A has a width WA that is greater than a width WC of the main storage section 120C, i.e., WA>WC. Widths WA and WC may be constant throughout most or all of the sections 120A and 120C, respectively, if the segments 122A and 122C are parallel as in FIG. 6. If the segments 122A and 122C taper toward the bottom edge 124, the larger top section 120A has a minimum width WA that is greater than a maximum width WC of the main storage section 120C. For example, the width ratio is as follows: $0.60WA \leq WC \leq 0.95WA$. In another embodiment, the width ratio is as follows $0.65\ WA \leq WC \leq 0.85WA$. In an embodiment, the segments 122A are parallel to one another, whereas the segments 122C taper toward the bottom edge 124 (and may be mirror images of another, with or without curvature (i.e., they may or may not be arcuate). The minimum width WD of the narrower disposal section 120D is less than the width WC of the main storage section 120C as follows: $0.50\ WC \leq WD \leq 0.98WC$. In an embodiment, WA is equal to 30.0 cm±6.0 cm, and has length L equal to 77.0 cm+20.0 cm/−20.0 cm.

The bags, such as bag 120, have a length L that may be segmented as LA, LB, LC and LD, to be representative of the height of sections 120A, 120B, 120C and 120D, respectively. In accordance with an embodiment, LC is at least twice the length of LA, i.e., LC>2LA. In accordance with another embodiment including the tapering section 120B, LC is at least twice the length of the combination of LA and LB, i.e., LC>2(LA+LB). LA may be separated into LA1 and LA2 if the top edge 123 defines a concavity or convexity as detailed above with respect to FIGS. 5B-5C. LA2 is the portion of the section 120A below such concavity or convexity. In accordance with an embodiment, LC is at least equal to the length of LD, i.e., LC=LD, but may be at least 10% longer, i.e., LC>1.1LD, or even longer, such as according to the relation LC>3LD. In accordance with an embodiment, 0.30L>LD>0.15L to minimize the reduction in open diameter. As the bag 120 is filled when coming out of a throat of a waste disposal device 10, as shown in the previous figures, the tapering of the bag 120 to the bottom edge 124 facilitates the removal of the bag from the device 10.

The top edge 123 may have different outlines. In FIG. 6, the outline of the top edge 123 is a straight segment. Other outlines are contemplated. As the bags are interconnected end to end in the bag roll 120 with adjacent bags connected bottom to top as described above, the bottom edge 124 has a shape that is complementary to the top edge 123. Stated differently, if the outline of the top edge 123 is a concave sine waveform, the bottom edge 124 is a convex sine waveform, etc.

Tear-off perforation lines 126 are punctured at the junction between the bottom edge 124 of a first bag, the leading bag such as 120', and the top edge 123 of the subsequent bag in the bag roll 120, the trailing bag such as 120". The tear-off perforation line 126 may be defined by a series of spaced-apart punctures along an outline emulating that of the bottom edge 123 and the top edge 124. The tear-off perforation line 126 is adjacent to the weld seam 125, and forms a weakened portion of the bag roll 120, causing a separation of one of the bags, as a result of a tearing action. In an embodiment, the tear-off perforation lines 126 and cut outs at the sides of the weld seams 125 are done by die cutting.

It is pointed out that the bag roll cassette 10 and/or the bag roll 20, 120 may be used in any other disposal unit, with or without the same components as the disposal unit 50 of FIGS. 3 and 4. The disposal unit 50 is provided as an exemplary bin configuration adapted to be used with the bag roll cassette 10 and/or the bag roll 20, 120, yet variants of the disposal unit 50 can be used with the bag roll cassette 10 and/or the bag roll 20, 120 as well.

The invention claimed is:

1. A bag comprising:

a tubular body with a top open end and a bottom closed end, the tubular body having a first section adjacent the top open end, and at least a second section adjacent to the bottom closed end, the first section joined to the second section via a weld seam between the first section and the second section, the first section made of a material having stretchability characteristics different than that of a material of the second section, the first section having a greater stretchability than the second section, wherein the material of the first section is LLDPE and the material of the second section includes HDPE, the tubular body in a flattened two-fold condition having a pair of side edges extending from a top edge to a bottom edge, the top edge delimiting the top open end, the bottom edge delimiting the bottom closed end, the tubular body having an inner surface extending from the top edge and an opposite outer surface extending from the top edge, the inner surface facing an interior of the bag from the top edge and extending into the at least second section to face a waste receiving volume of the bag.

2. The bag as defined in claim 1, wherein the tubular body in the first section has an elongation at break greater than that of the tubular body in the second section.

3. The bag as defined in claim 1, wherein the tubular body in the first section has an elongation at break between 105% and 200% of that of the tubular body in the second section.

4. The bag as defined in claim 1, wherein the tubular body in the first section has a yield strength smaller than that of the tubular body in the second section.

5. The bag as defined in claim 1, wherein the tubular body in the first section has a yield strength between 50% and 95% of that of the tubular body in the second section.

6. The bag as defined in claim 1, wherein the tubular body in the first section has an elastic modulus smaller than that of the tubular body in the second section.

7. The bag as defined in claim 1, wherein the first section is a top section and the second section is a middle section, the tubular body further having a bottom section defining the closed bottom end, the top section having a length LA, the middle section having a length LB and the bottom section having a length LC, the length LA smaller than LB+LC.

8. The bag as defined in claim 1, wherein the first section has a length LA extending from the top open end and the second section extends from the first section to the bottom closed end, the second section having a length LB, the length LA between 5% and 20% of the length LB.

9. The bag as defined in claim 1, wherein the first section has a length LA extending from the top open end and the second section extends from the first section to the bottom closed end, the second section having a length LB, the length LA smaller than a third of the length LB.

10. A bag roll comprising:

a plurality of the bag according to claim 1, wherein the bags are connected end to end and from the bottom edge of a first of the bags in the bag roll, to the top edge of a second of the bags in the bag roll.

11. The bag as defined in claim 1, wherein the weld seam extends transversely with respect to the pair of side edges.

12. A bag roll comprising:

a plurality of bags connected end to end and from a bottom edge of a bag of the plurality of bags in the bag roll to a top edge of a subsequent bag of the plurality of bags in the bag roll, the plurality of bags defined by:

a tubular body with a top open end and a bottom closed end, the tubular body having a first section adjacent the top open end, and at least a second section adjacent to the bottom closed end, the first section joined to the second section via a weld seam between the first section and the second section, the first section having surface features only in the first section, the first section having a greater stretchability than the second section, and the tubular body in a flattened two-fold condition having a pair of side edges extending from the top edge to the bottom edge, the top edge delimiting the top open end, the bottom edge delimiting the bottom closed end.

13. The bag as defined in claim 12, wherein the surface features are defined by a surface pattern including an array of dimples formed into the tubular body in the first section.

14. The bag as defined in claim 12, wherein the surface features include one of rounded, diamond shaped, and honeycomb shaped dimples.

15. The bag as defined in claim 12, wherein the surface features include at least one peripherally extending line of embossed areas spaced apart from each other by non embossed areas.

16. The bag as defined in claim 12, wherein the surface features include corrugations extending in a direction from the top open end to the bottom closed end.

17. The bag as defined in claim 12, wherein the surface features include corrugations extending from the top open end along all of a length of the first section, without extending in the second section.

18. The bag as defined in claim 12, wherein the surface features includes corrugations and interstitial spaces inherent to the corrugations defining a pattern of adjacent thinner and thicker areas of the tubular body in the first section.

19. The bag as defined in claim 12, wherein the surface features are spread on an entire surface of the tubular body in the first section.

20. The bag as defined in claim 12, wherein the weld seam extends transversely with respect to the pair of side edges.

21. A bag comprising:

a tubular body with a top open end and a bottom closed end, the tubular body having a first section adjacent the top open end, and at least a second section adjacent to the bottom closed end, the first section joined to the second section via a weld seam between the first section and the second section, the first section having corrugations defined in a material of the tubular body, the corrugations being only in the first section of the tubular body from the top open end, such that the first section has a greater stretchability than the second section, and the tubular body in a flattened two-fold condition having a pair of side edges extending from a top edge to a bottom edge, the top edge delimiting the top open end, the bottom edge delimiting the bottom closed end.

22. The bag as defined in claim 21, wherein the corrugations extend from the top open end along all of a length of the first section, without extending in the second section.

23. A bag roll comprising:

a plurality of the bag according to claim 21, wherein the bags are connected end to end and from the bottom edge of a first of the bags in the bag roll, to the top edge of a second of the bags in the bag roll.

24. The bag as defined in claim 21, wherein the weld seam extends transversely with respect to the pair of side edges.

* * * * *